United States Patent
Ito et al.

(10) Patent No.: US 7,256,519 B2
(45) Date of Patent: Aug. 14, 2007

(54) LINEAR ACTUATOR AND PUMP DEVICE AND COMPRESSOR DEVICE THEREWITH

(75) Inventors: Hideaki Ito, Komagane (JP); Yukinobu Yumita, Komagane (JP)

(73) Assignee: Nidec Sankyo Corporation, Nagano (JP)

( * ) Notice: Subject to any disclaimer, the term of this patent is extended or adjusted under 35 U.S.C. 154(b) by 223 days.

(21) Appl. No.: 11/186,585

(22) Filed: Jul. 21, 2005

(65) Prior Publication Data

US 2006/0033385 A1    Feb. 16, 2006

(30) Foreign Application Priority Data

Jul. 23, 2004   (JP)   .............................. 2004-215346

(51) Int. Cl.
*H02K 41/00*    (2006.01)
(52) U.S. Cl. ............................. 310/12; 310/15; 310/36; 417/417
(58) Field of Classification Search ................. 310/12, 310/15, 36; 417/417
See application file for complete search history.

(56) References Cited

U.S. PATENT DOCUMENTS 6,956,306 B2 * 10/2005 Yumita et al. ................ 310/12

7,030,518 B2 * 4/2006 Tsuboi et al. ................ 310/12

FOREIGN PATENT DOCUMENTS

JP    2000-337725    12/2000

\* cited by examiner

*Primary Examiner*—Darren Schuberg
*Assistant Examiner*—Iraj A. Mohandesi
(74) *Attorney, Agent, or Firm*—Reed Smith LLP (57) ABSTRACT

A linear actuator includes a driving part having an inner yoke, an outer yoke and a coil for generating an alternating magnetic field and includes a movable body provided with a magnet disposed between the inner yoke and the outer yoke. The movable body is formed in a tubular shape having an aperture edge part at least one end is opened, and the aperture edge part or a portion near the aperture edge part disposed between the inner yoke and the outer yoke is positioned closer to the inner yoke side than to the outer yoke side. Alternatively, the linear actuator may includes an expansion preventing member which is disposed at the aperture edge part or the portion near the aperture edge part for preventing the aperture edge part from expanding.

15 Claims, 9 Drawing Sheets

LINEAR ACTUATOR AND PUMP DEVICE AND COMPRESSOR DEVICE THEREWITH

CROSS-REFERENCE TO RELATED APPLICATIONS

This application claims priority to Japanese Application No. 2004-215346 filed Jul. 23, 2004, which is incorporated herein by reference.

FIELD OF THE INVENTION

The present invention relates to a linear actuator and a pump device and a compressor provided with the linear actuator.

BACKGROUND OF THE INVENTION

A conventional pump device and a conventional compressor device in which a piston moves within a cylinder in a linear manner includes a main body part which is provided with the cylinder and a linear actuator for driving the piston. A linear motor is used to reciprocate the piston in an axial direction as a driving part in the linear actuator (see, for example, Japanese Patent Laid-Open No. 2000-337725).

When the linear actuator is used as a drive source for a pump device or a compressor device, an ambient temperature at the time of the operation may rise to around 80 degrees Celsius. The movable body is disposed between the outer side laminated cores and the inner side laminated cores. The movable body includes a frame formed in a short cylindrical shape and the permanent magnet groups fixed at one end of the frame with an adhesive or the like. In this case, since the security of rigidity is difficult in the structure at the open end side of the permanent magnet groups, the open end of the permanent magnet groups may open on the outward side in the radial direction as the temperature rises, and thus, in the worst case, they may contact the outer side laminated cores to cause malfunction.

SUMMARY OF THE INVENTION

In view of the problems described above, it is an object and advantage of the present invention to provide a linear actuator in which the open end side portion of the movable body disposed between the outer side laminated core and the inner side laminated core, where the open end side portion is not brought into contact with the outer side laminated core and malfunction is not induced even when an ambient temperature rises at the time of operation. It is also an object and advantage of the present invention to provide a pump device therewith and a compressor device therewith.

In order to achieve the above object and advantage, according to an embodiment of the present invention, there is provided a linear actuator including a driving part and a movable body, which are both described below. The driving part includes an inner yoke, an outer yoke which is disposed around the inner yoke such that a first gap space and a second gap space separated in an axial direction are formed between an outer peripheral face of the inner yoke and the outer yoke, and a coil for generating an alternating magnetic field in the first gap space and the second gap space with the outer yoke, the first gap space, the inner yoke, the second gap space and the outer yoke as a magnetic path. The movable body is provided with a magnet that is disposed between the inner yoke and the outer yoke and the movable body is reciprocated in the axial direction in cooperation with the alternating magnetic field. The movable body is formed in a tubular shape having an aperture edge part with at least one end opened. The aperture edge part or a portion near the aperture edge part is disposed between the inner yoke and the outer yoke and is positioned closer to the inner yoke side than to the outer yoke side.

In accordance with an embodiment of the present invention, the magnet disposed between the inner yoke and the outer yoke is preferably disposed at the aperture edge part or the portion near the aperture edge part and is positioned closer to the inner yoke side than to the outer yoke side. According to the construction described above, the attractive force by the magnet is applied to the inner yoke side more strongly than the outer yoke side. Therefore, the attractive force acts against the stress that causes the aperture edge part of the movable body to expand as the rise of the ambient temperature at which the linear actuator is operated and thus the expanding of the aperture edge part can be restrained.

In accordance with an embodiment of the present invention, the inner yoke comprises a plurality of inner yokes disposed at an equal angular interval in a circumferential direction, each of the plurality of inner yokes has a planar opposite face to the outer yoke, the outer yoke comprises a plurality of outer yokes disposed at an equal angular interval in a circumferential direction, each of the plurality of outer yokes has a planar opposite face to the inner yoke, the magnet comprises a plurality of magnets which are respectively disposed between the inner yoke and the outer yoke, and all the plurality of magnets are positioned closer to the inner yoke side than to the outer yoke side.

According to another embodiment of the present invention, there is provided a linear actuator including a driving part described below and a movable body described below. The driving part includes an inner yoke, an outer yoke which is disposed around the inner yoke such that a first gap space and a second gap space separated in an axial direction are formed between an outer peripheral face of the inner yoke and the outer yoke, and a coil for generating an alternating magnetic field in the first gap space and the second gap space with the outer yoke, the first gap space, the inner yoke, the second gap space and the outer yoke as a magnetic path. The movable body is provided with a magnet which is disposed between the inner yoke and the outer yoke, the movable body being reciprocated in the axial direction in cooperation with the alternating magnetic field, the movable body being formed in a tubular shape having an aperture edge part at least one end is opened, and the aperture edge part being disposed between the inner yoke and the outer yoke. In addition, an expansion preventing member is disposed at the aperture edge part or the portion near the aperture edge part for preventing the aperture edge part from expanding.

In accordance with an embodiment of the present invention, the inner yoke comprises a plurality of inner yokes disposed at an equal angular intervals in a circumferential direction, each of the plurality of inner yokes has a planar opposite face to the outer yoke, and the outer yoke comprises a plurality of outer yokes disposed at an equal angular interval in a circumferential direction, each of the plurality of outer yokes has a planar opposite face to the inner yoke. The magnet comprises a plurality of magnets that are respectively disposed between the inner yoke and the outer yoke. In addition, magnet holding parts for holding both sides of the magnet are provided, each of which is disposed between adjacent magnets such that at least a part of the magnet holding part is positioned between adjacent inner yokes and between adjacent outer yokes, and the magnet holding part includes an abutting part of the expansion preventing member formed in a ring shape which abuts with an opposite face of the magnet to the outer yoke. According to the construction described above, the expanding of the aperture edge part can be restrained by the abutting part against the stress which causes the aperture edge part to expand due to the attraction of the magnet to the outer yoke. Moreover, since the abutting part of the expansion preventing member is provided in the magnet holding part, the abutting part is not required to be disposed between the outer yoke and the magnet and thus the outer yoke and the magnet can be positioned in close proximity. Therefore, the improvement of the magnetic efficiency in the linear actuator and the shortening in the radial direction can be attained. In this case, the expansion preventing member is preferably formed of non-magnetic material.

As described above, in accordance with the embodiment of the present invention, the aperture edge part or a portion near the aperture edge part disposed between the inner yoke and the outer yoke is positioned closer to the inner yoke side than to the outer yoke side. Therefore, even when the aperture edge part of the movable body expands as an ambient temperature rises at which the linear actuator is operated, the aperture edge part does not contact with the outer yoke. Alternatively, in accordance with another embodiment of the present invention, the expansion preventing member is disposed at the aperture edge part or the portion near the aperture edge part for preventing the aperture edge part from expanding. Therefore, even when the ambient temperature rises at which the linear actuator is operated, the expanding of the aperture edge part can be restrained. Accordingly, even when the ambient temperature rises at the time of operation, malfunction can be prevented where the aperture edge part of the movable body disposed between the outer yoke and the inner yoke is brought into contact with the outer yoke.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

A linear actuator to which the present invention is applied will be described below with reference to the accompanying drawings.

Figure 1:
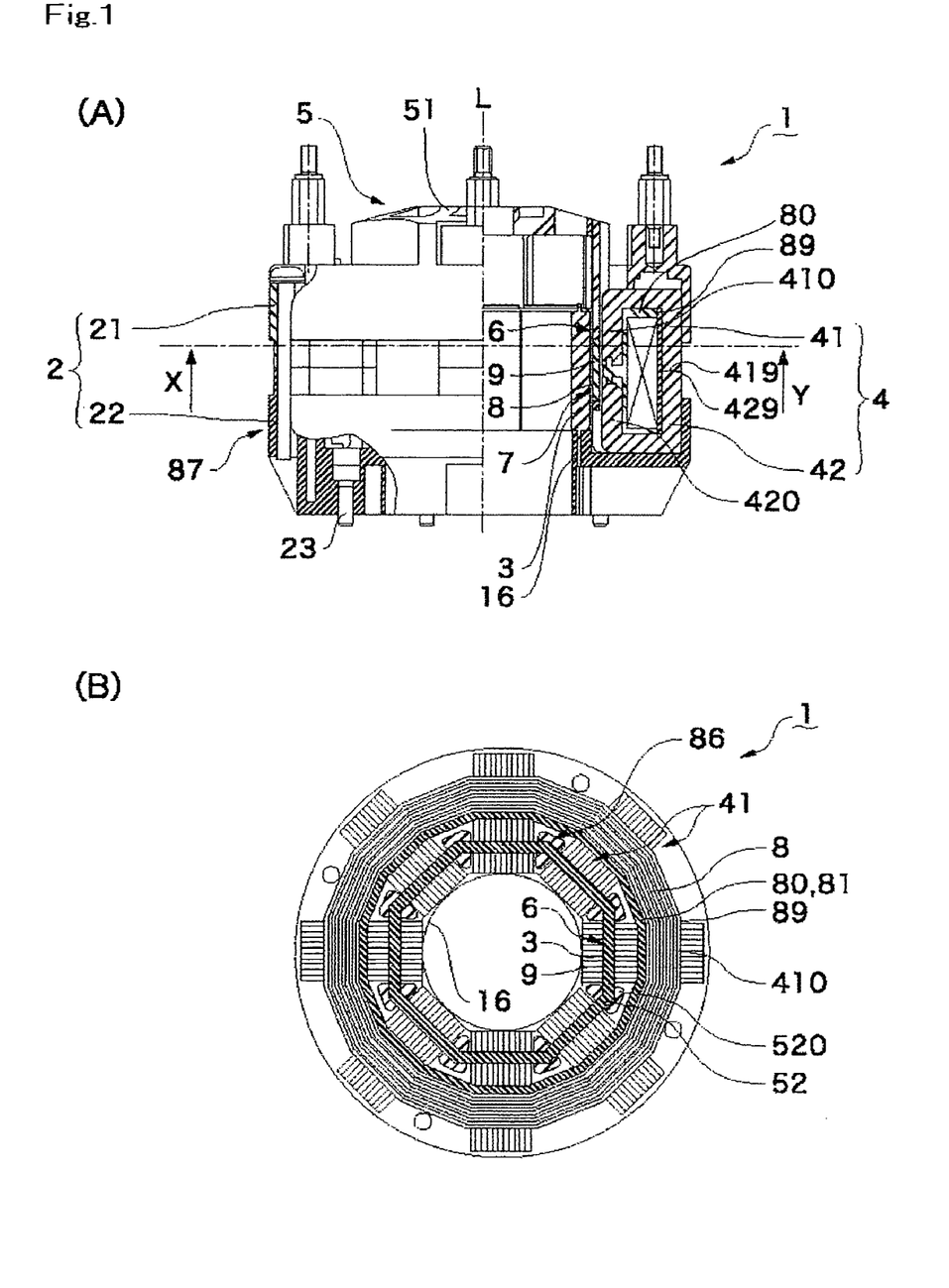
FIG. 1(A) is a longitudinal cross-sectional view showing an essential portion of a linear actuator in accordance with an embodiment of the present invention and FIG. 1(B) is an X-Y transverse cross-sectional view of FIG. 1(A).
Figure 2:
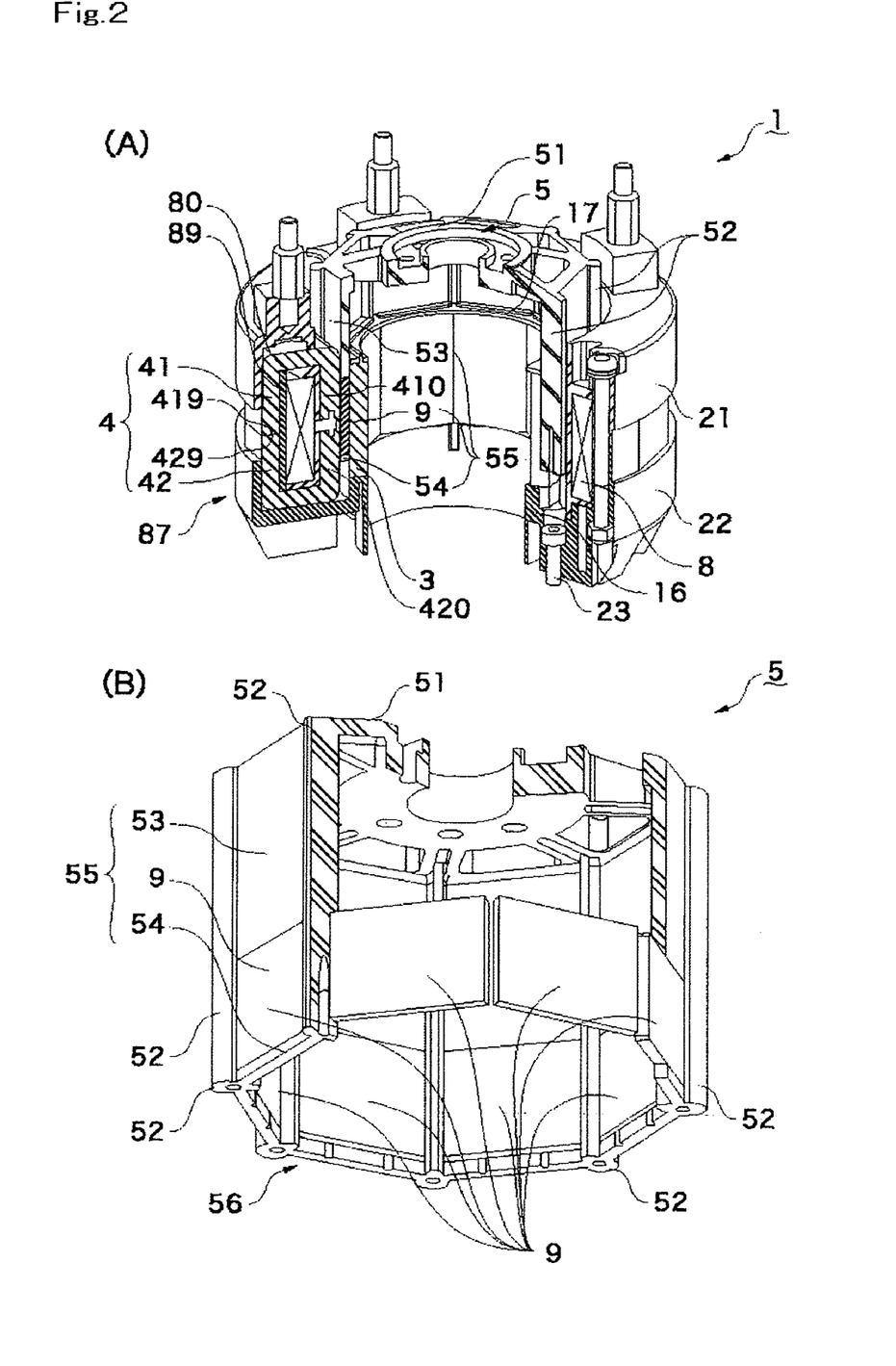
FIG. 2(A) is a perspective view showing the linear actuator which is partially cut and viewed obliquely from above.
FIG. 2(B) is a perspective view showing a movable body that is partially cut and viewed obliquely from below.
Figure 3:
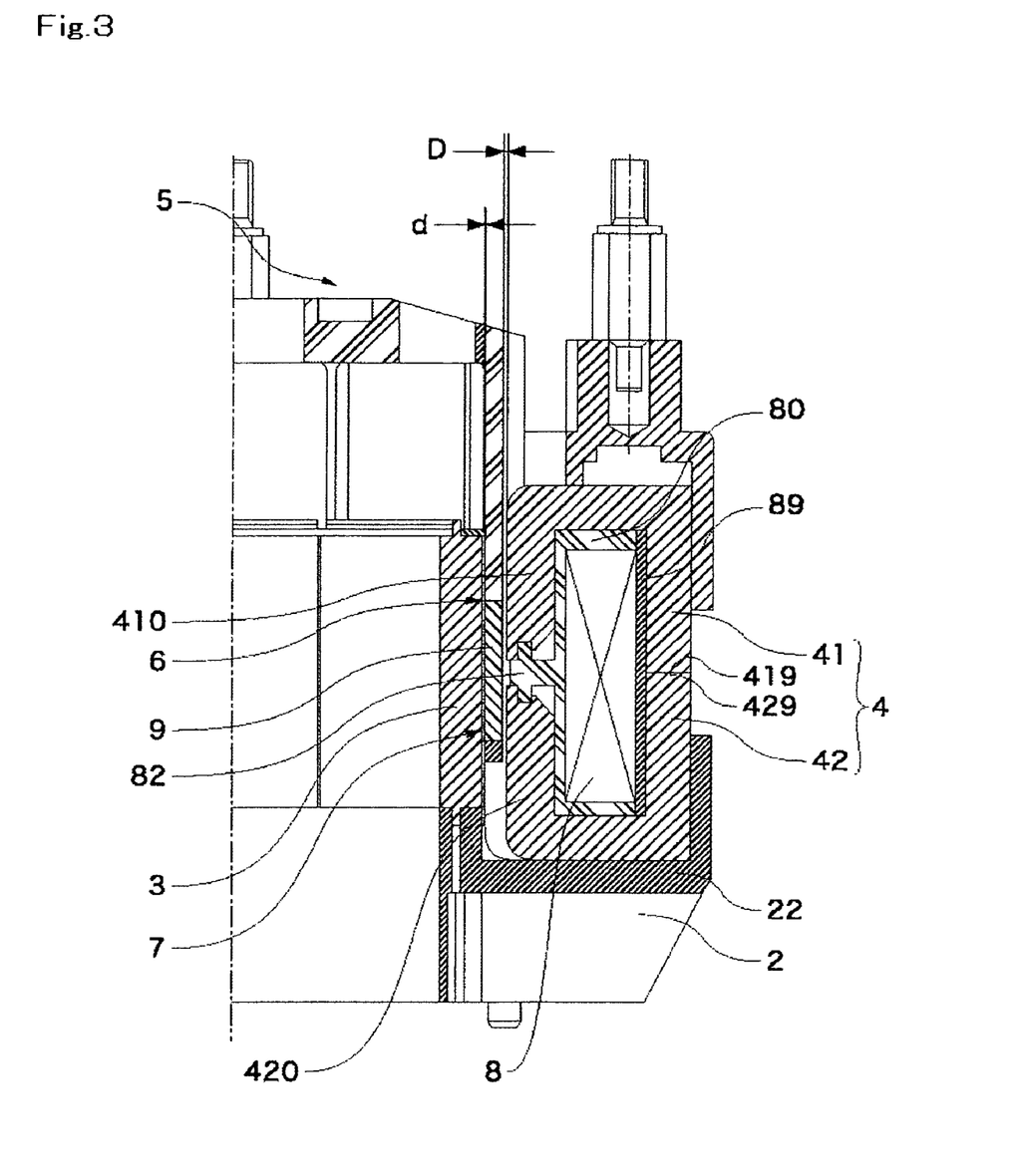
FIG. 3 is an enlarged longitudinal cross-sectional view showing an essential portion of the linear actuator.

FIG. 1(A) is a longitudinal cross-sectional view showing an essential portion of a linear actuator in accordance with an embodiment of the present invention and FIG. 1(B) is an X-Y transverse cross-sectional view of FIG. 1(A). FIG. 2(A) is a perspective view showing the linear actuator which is partially cut and viewed obliquely from above, and FIG. 2(B) is a perspective view showing a movable body which is partially cut and viewed obliquely from below. FIG. 3 is an enlarged longitudinal cross-sectional view showing an essential portion of the linear actuator.

In FIGS. 1(A), 1(B) and FIG. 2(A), a linear actuator 1 in accordance with an embodiment of the present invention is used in a pump device or a compressor device for supplying various fluids. The linear actuator 1 includes a driving part 87 provided with a frame 2 which interposes and holds a stator in an axial direction and a movable body 5 which is capable of being reciprocated along an axial line "L" with respect to the driving part 87.

As shown in FIGS. 1(A) and 1(B), a cylindrical part 16 in a cylindrical shape is formed in the holder 22 of the frame 2 in the driving part 87. On the upper end of the cylindrical part 16 are fixed inner yokes 3, one end of which are fixed to a holder body 17 formed in a ring shape. The inner yokes 3 are disposed at eight places at an equal angular interval in a circumferential direction. The inner yoke 3 is formed in a flat plate shape, and both the opposite face to the outer yoke 4 (outer side face) and its rear face (inner side face) are formed in a flat face.

Outer yokes 4 in a block shape are disposed between a pair of holders 21, 22 as the frame 2 such that a first and a second gap spaces 6, 7 are formed with the opposite face of the inner yoke 3 at positions separated in an axial direction. The outer yokes 4 in a block shape are mounted between the pair of holders 21, 22 at eight places at an equal angular interval in the circumferential direction through a gap space 86 (see FIG. 1(B)). The opposite face of the outer yoke 4 to the inner yoke 3 is formed in a flat face. The opposite faces of the inner yoke 3 and the outer yoke 4 which are formed in a flat face towards each other are separated with about 3 mm and formed to be parallel.

The outer yoke 4 is constructed of two upper and lower outer yoke members 41, 42, each of which is formed in a U-shape in a longitudinal cross section. Inner side bent portions of the respective outer yoke members 41, 42 in the axial direction are a first and a second facing portions 410, 420 which face the inner yoke 3 through the first and the second gap spaces 6, 7. End parts 419, 429 are abutted each other which are outer side bent portions of the respective outer yoke members 41, 42 in the axial direction. Each of two outer yoke members 41, 42 is made of a plurality of magnetic thin plates, which are placed such that the respective end faces face the inner yoke 3 and laminated to constructed a block body. Therefore, it is advantageous that the eddy current loss is relatively small in the outer yoke 4.

A coil 8 formed in a ring and planar shape is wound around a coil bobbin 80 and disposed in a space constructed between two outer yoke members 41, 42 of the outer yoke 4. The outer side of the coil 8 is covered with a cover 89 made of resin. The coil 8 is a common coil that is wound around to surround the entire eight outer yokes. The outer yoke members 41, 42, respectively, includes outer portions located on the outer peripheral side of the coil 8, middle portions passing over the end faces of the coil 8 in the axial direction, and inner bent portions in the axial direction. The tip end sides of the inner bent portions are formed to be the above-mentioned facing portions 410, 420.

Figure 5:
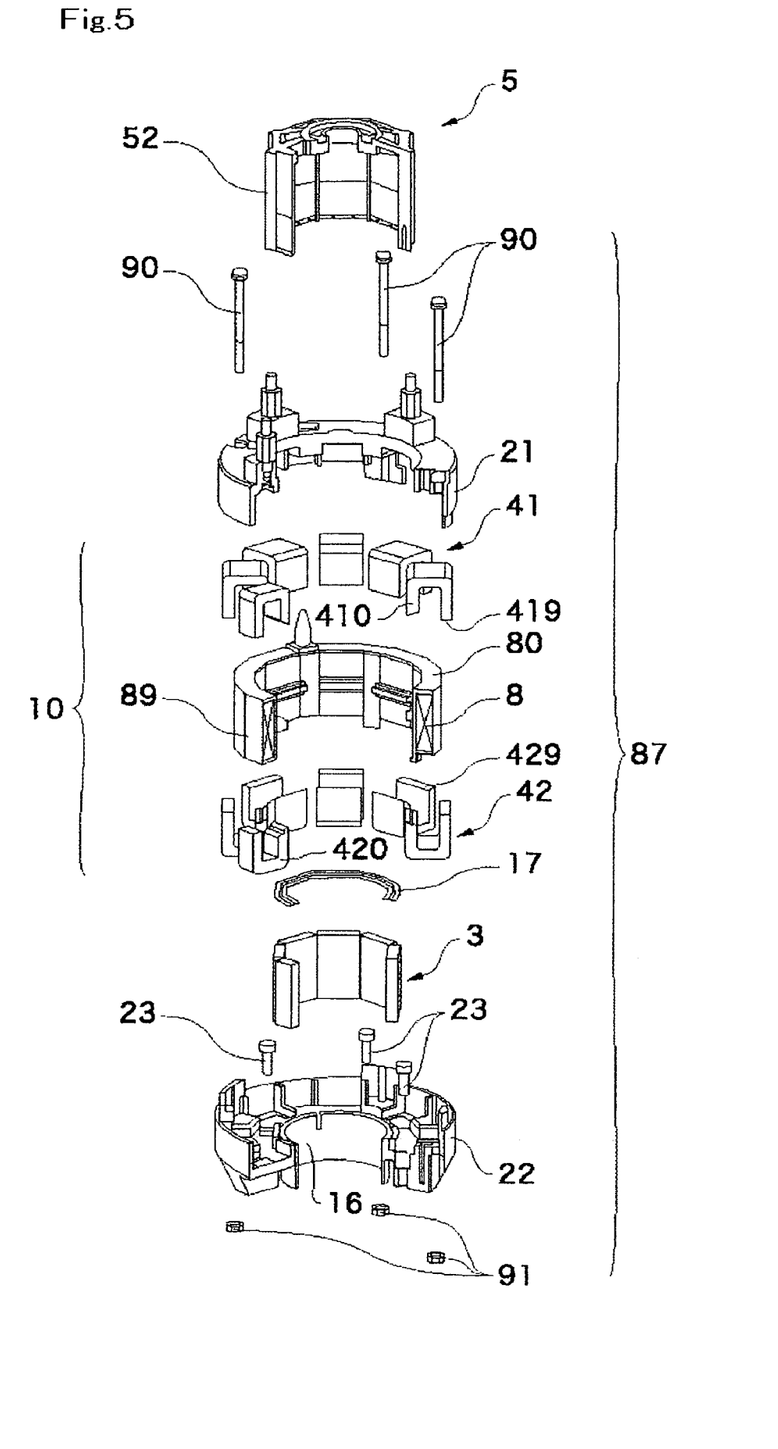
FIG. 5 is an exploded perspective view showing respective members structuring the linear actuator which are viewed obliquely from above.

In the embodiment of the present invention, the cup-shaped movable body 5 shown in FIGS. 2(A), 2(B) and FIG. 5 is disposed with respect to the driving part 87 structured as described above. The movable body 5, which is a resin molded product, includes a bottom part 51 formed in a regular octagonal shape, elongated magnet holding parts 52 extended in the axial direction from the corner part of the bottom part 51, and sidewall parts 55 which are provided so as to close the side faces of adjacent magnet holding parts 52 as shown in FIG. 2(B). In the embodiment of the present invention, all side faces of the magnet holding parts 52 are closed by the sidewall parts 55 to construct a tubular shape.

The sidewall part 55 is integrally formed with a resin wall 53, the magnet 9 and a resin wall 54 by integral moulding toward the open end side from the bottom part 51. In other words, the movable body 5 is a resin molded product in which the magnet 9 is insert molded. The magnet holding parts 52 are formed at eight positions. Eight pieces of magnets 9 are held by the magnet holding parts 52 at an equal angular interval in the circumferential direction. The magnet 9 is formed in a flat plate shape with the thickness of about 2 mm. Both faces of the magnet 9 in the thickness direction are formed to be a flat face in an exposed state, which are an opposite face to the outer yoke 4 (outer side) and an opposite face to the inner yoke 3 (inner side). The inside and outside faces of the resin wall 53 and the resin wall 54 are respectively formed to be in the same plane with the both opposite faces of the magnet 9.

The magnet 9 is a rare-earth magnet of Nd-Fe-B system or a resin magnet. The front and rear faces of the magnet 9 are magnetized in opposite polarities respectively.

As shown in FIG. 1(B), the magnet holding part 52 is formed in an approximately triangular planar shape when viewed from the axial direction. The portion corresponding to the apex of a triangle is positioned between adjacent inner yokes 3 in a wedge-shaped manner and the portion corresponding to the base side of the triangle is positioned between adjacent outer yokes 4.

The movable body 5 structured as described above is disposed with respect to the driving part 87 as shown in FIG. 1(A), and eight pieces of magnets 9 are respectively positioned in the first and the second gap spaces 6, 7 formed by the inner yoke 3 and the outer yoke 4. In the embodiment of the present invention, all eight pieces of magnets 9 which are disposed between the inner yoke 3 and the outer yoke 4 are positioned closer to the inner yoke 3 side than to the outer yoke 4 side. In other words, the distance "d" (see FIG. 3) between the inner yoke 3 and the opposite face of the magnet 9 that is opposite to the inner yoke 3 is set to be 0.4 mm, and the distance "D" (see FIG. 3) between the outer yoke 4 and the opposite face of the magnet 9 that is opposite to the outer yoke 4 is set to be 0.6 mm.

These distances are not limited to 0.4 mm and 0.6 mm. These distances may be properly set depending on the separated distance between the opposite faces of the inner yoke 3 and the outer yoke 4 or on the thickness of the magnet 9 as long as the sidewall part 55 does not come into contact with the outer yoke 4 even when the sidewall part 55 opens on the outward side in the radial direction as the temperature rises. In addition, all the magnets 9 disposed between the inner yoke 3 and the outer yoke 4 are not necessarily needed to be positioned closer to the inner yoke 3 side than to the outer yoke 4 side. For example, when eight pieces of magnets 9 are disposed in a regular octagonal shape as described in this embodiment of the present invention, every other magnet 9 in the circumferential direction may be positioned closer to the inner yoke 3 side. The magnets 9 disposed in close proximity to the inner yoke 3 may be properly arranged in consideration of the entire balance.

Figure 4:
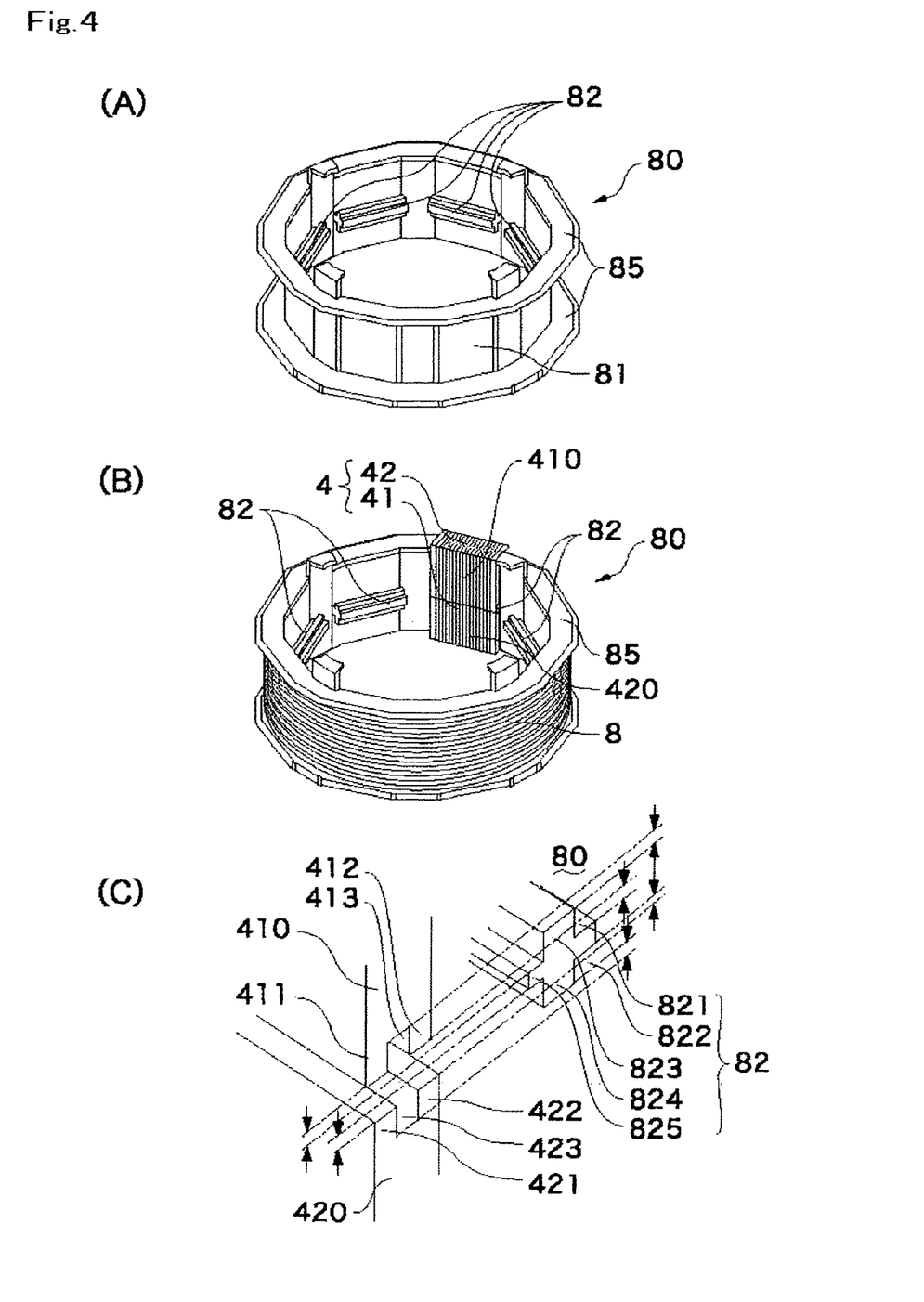
FIG. 4(A) is a perspective view showing a coil bobbin used in the linear actuator.
FIG. 4(B) is an explanatory perspective view showing the coil bobbin and an outer yoke.
FIG. 4(C) is an explanatory view showing the engagement parts of the coil bobbin and the outer yoke.

FIG. 4(A) is a perspective view showing a coil bobbin used in the linear actuator in accordance with an embodiment of the present invention, FIG. 4(B) is an explanatory perspective view showing the coil bobbin and an outer yoke, and FIG. 4(C) is an explanatory view showing the engagement parts of the coil bobbin and the outer yoke.

In the linear actuator 1 in accordance with an embodiment of the present invention, the coil bobbin 80 is comprised of a cylindrical body part 81 and flange parts 85 extended outward in the radial direction from both ends of the body part 81. The insulation between the coil 8 and the first facing portion 410 of the outer yoke 4 and the insulation between the coil 8 and the second facing portion 420 are ensured by the body part 81. Further, the insulations between the coil 8 and the outer yokes 4 which are positioned over the both end faces of the coil 8 in the axial direction are ensured by the flange parts 85 of the coil bobbin 80.

As shown in FIG. 3 and FIGS. 4(A), 4(B) and 4(C), on the inner peripheral face of the body part 81 is formed an engaging protrusion part 82 which is protruded toward the inner yoke 3. The engaging protrusion part 82 is an engagement part which engages with both the first facing portion 410 and the second facing portion 420 and prevents the first and the second facing portions 410, 420 from being attracted to the magnet 9 to be displaced.

As shown in FIG. 4(C), the engaging protrusion part 82 includes protrusion parts 823, 824 which are protruded in the axial direction so as to form recessed parts 821, 822 opening in the axial direction along with the inner peripheral face of the body part 81, and a small projecting part 825 projecting toward the inner yoke 3 from the center of the protrusion parts 823, 824 in the axial direction.

On the other hand, inner peripheral side protrusion parts 411, 421 and the outer peripheral side protrusion parts 412, 422 are respectively formed at the tip end portion of the first facing portion 410 and the tip end portion of the second facing portion 420. Recessed parts 413, 423 opening in the axial direction are respectively formed between the protrusion parts 411, 412 and between the protrusion parts 421, 422.

Therefore, when the first and the second outer yoke members 41, 42 are overlaid on the coil bobbin 80 from both sides in the axial direction and the end parts 419, 429 of the first and the second outer yoke members 41, 42 are abutted with each other on the outer peripheral side of the coil 8, the outer peripheral side protrusion parts 412, 422 of the first and the second outer yoke members 41, 42 are fitted into the recessed parts 821, 822 of the engaging protrusion part 82 on the inner peripheral side of the coil and the recessed parts 413, 423 of the first and the second outer yoke members 41, 42 are fitted to the protrusion parts 823, 824 of the engaging protrusion part 82. In addition, the tip ends of the inner peripheral side protrusion parts 411, 421 of the first and the second outer yoke members 41, 42 may abut with the small projecting part 825 of the engaging protrusion part 82.

The coil bobbin 80 is formed with engaging protrusion parts 82 at eight positions in the circumferential direction. In other words, eight engaging protrusion parts 82 are disposed in the circumferential direction so as to surround the inner yoke 3. Therefore, the first facing portion 410 and the second facing portion 420 are held by the coil bobbin 80 and thus they do not displace in the radial direction even when the attractive force of the magnet 9 is applied.

FIG. 5 is an exploded perspective view showing respective members structuring the linear actuator in accordance with an embodiment of the present invention which are viewed obliquely from above. In the embodiment of the present invention, the coil 8 and the outer yoke members 41, 42 are assembled beforehand to be an assembled component 10. The assembled component 10 is structured such that, after the coil 8 is wound around the coil bobbin 80, the first and the second outer yoke members 41, 42 are overlaid on the coil bobbin 80 from both sides in the axial direction so as to stride over the coil bobbin 80 from the upper and lower sides.

The assembling of the linear actuator 1 in accordance with an embodiment of the present invention will be performed based on the following steps. First, one end of the inner yoke 3 is fixed to the upper end of the cylindrical part 16 of the holder 22. After all the inner yokes 3 are fixed to the cylindrical part 16, the holder body 17 is engaged with the other ends of the inner yokes 3. Next, three male screws 23 are dropped into screw holes which are formed in the holder 22 and then the above mentioned assembled component 10 is dropped over the male screws 23 to set the assembled component 10 at a predetermined position of the holder 22.

The holder 21 is placed on the assembled component 10 from the upper side and then the holders 21, 22 are fixed by fixing bolts 90 and fixing nuts 91 which are disposed at three positions in the circumferential direction. In this case, the assembled component 10 is fixed to the holders 21, 22 in the state that the assembled component 10 is held by the holders 21, 22. Finally, the linear actuator 1 is structured by using the movable body 5 which is dropped into the gap space between the inner yoke 3 and the outer yoke 4.

Figure 6:
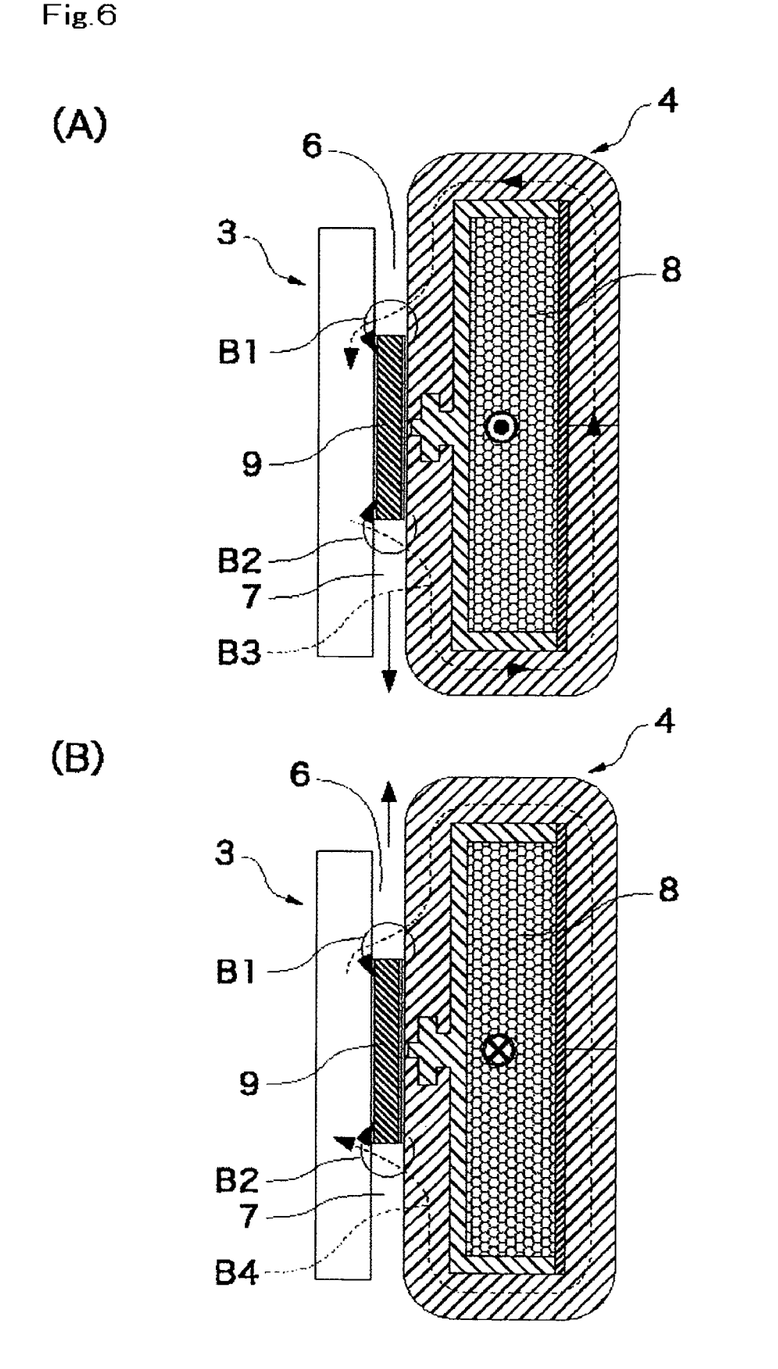
FIGS. 6(A) and 6(B) are respectively explanatory views showing different operating states of the linear actuator.

FIGS. 6(A) and 6(B) are respectively explanatory views showing different operating states in the linear actuator.

In the linear actuator 1 in accordance with an embodiment of the present invention, when the inner face of the magnet 9 is magnetized in an S-pole and its outer face is magnetized in an N-pole, the magnetic fields as shown by the arrows "B1", "B2" in a solid line are generated as shown in FIGS. 6(A) and 6(B). In this state, in the case that an AC current is applied to the coil 8, when an electric current flows up from the paper surface in the drawing as shown in FIG. 6(A), the magnetic field shown by the arrow "B3" in a dotted line is generated. Therefore, the direction of the magnetic field from the magnet 9 is the same as that of the magnetic lines of force from the coil 8 in the first gap space 6. On the other hand, the direction of the magnetic field from the magnet 9 is opposite to that of the magnetic lines of force from the coil 8 in the second gap space 7. As a result, a downward force (the second gap space 7 side) in the axial direction is applied to the magnet 9.

When an electric current flows down into the paper surface in the drawing as shown in FIG. 6(B), the magnetic field shown by the arrow "B4" in a dotted line is generated. The direction of the magnetic field from the magnet 9 is opposite to that of the magnetic lines of force from the coil 8 in the first gap space 6, but the direction of the magnetic field from the magnet 9 is the same as that of the magnetic lines of force from the coil 8 in the second gap space 7. As a result, an upward force (the first gap space 6 side) in the axial direction is applied to the magnet 9.

In this manner, the direction of force applied to the magnet 9 in the axial direction is changed corresponding to the direction of the alternating magnetic field by the coil 8. Therefore, the movable body 5 integrally provided with the magnet 9 oscillates in the axial direction and a reciprocated linear motion is outputted from the piston 130 which is mounted to the movable body 5.

As described above, in this embodiment of the present invention, the linear actuator 1 includes the driving part 87 and the movable body 5. The driving part 87 includes the inner yoke 3, the outer yoke 4 which is disposed around the inner yoke 3 such that the first gap space 6 and the second gap space 7 separated in the axial direction are formed between the outer peripheral face of the inner yoke 3 and the outer yoke 4, and the coil 8 for generating an alternating magnetic field in the first gap space 6 and the second gap space 7 with the outer yoke 4, the first gap space 6, the inner yoke 3, the second gap space 7 and the outer yoke 4 as its magnetic path. The movable body 5 is provided with the magnet 9 which is disposed between the inner yoke 3 and the outer yoke 4 and is reciprocated in the axial direction in cooperation with the alternating magnetic field. The movable body 5 is formed in a tubular shape having an aperture edge part 56 which is opened at one end. The aperture edge part 56 is disposed between the inner yoke 3 and the outer yoke 4 and is positioned closer to the inner yoke 3 side than to the outer yoke 4 side. Therefore, even when the aperture edge part 56 of the movable body 5 is expanded as the ambient temperature rises at which the linear actuator 1 is operated, the outer yoke 4 does not contact with the movable body 5. Therefore, even when the ambient temperature rises at the time of operation, malfunction can be prevented where the aperture edge part 56 of the movable body 5 disposed between the outer yoke 4 and the inner yoke 3 is brought into contact with the outer yoke 4.

Further, the magnet 9 disposed between the inner yoke 3 and the outer yoke 4 is disposed in the vicinity of the aperture edge part 56 and positioned closer to the inner yoke 3 side than to the outer yoke 4 side, and thus the attractive force of the magnet 9 is applied to the inner yoke 3 side more strongly than the outer yoke 4 side. Therefore, since this attractive force acts on the aperture edge part 56 of the movable body 5 against the stress that causes the aperture edge part 56 to expand with the rise of the ambient temperature at which the linear actuator 1 is operated, and thus the expanding of the aperture edge part 56 can be restrained.

In addition, eight outer yokes 4 and eight inner yokes 3 are respectively disposed at an equal angular interval in the circumferential direction so as to have opposite faces formed in a flat face, and all eight magnets 9 provided in the movable body 5 which are disposed between the inner yokes 3 and the outer yokes 4 are positioned closer to the inner yoke 3 side than the outer yoke 4 side, and thus the expanding of the aperture edge part 56 can be surely prevented.

Next, the movable body 5 in accordance with another embodiment of the present invention will be described. In the above-mentioned embodiment of the present invention, the movable body 5 disposed between the inner yoke 3 and the outer yoke 4 is positioned closer to the inner yoke 3 side than the outer yoke 4 side. However, an expansion preventing member 20 may be disposed near the aperture edge part 56 of the movable body. In this case, the structure of the driving part 87 in this embodiment may be the same as the above-mentioned embodiment and thus its description is omitted. Further, the same notational symbols refer to the same members of the movable body 5 in the above-mentioned embodiment and their descriptions are omitted or simplified.

Figure 7:
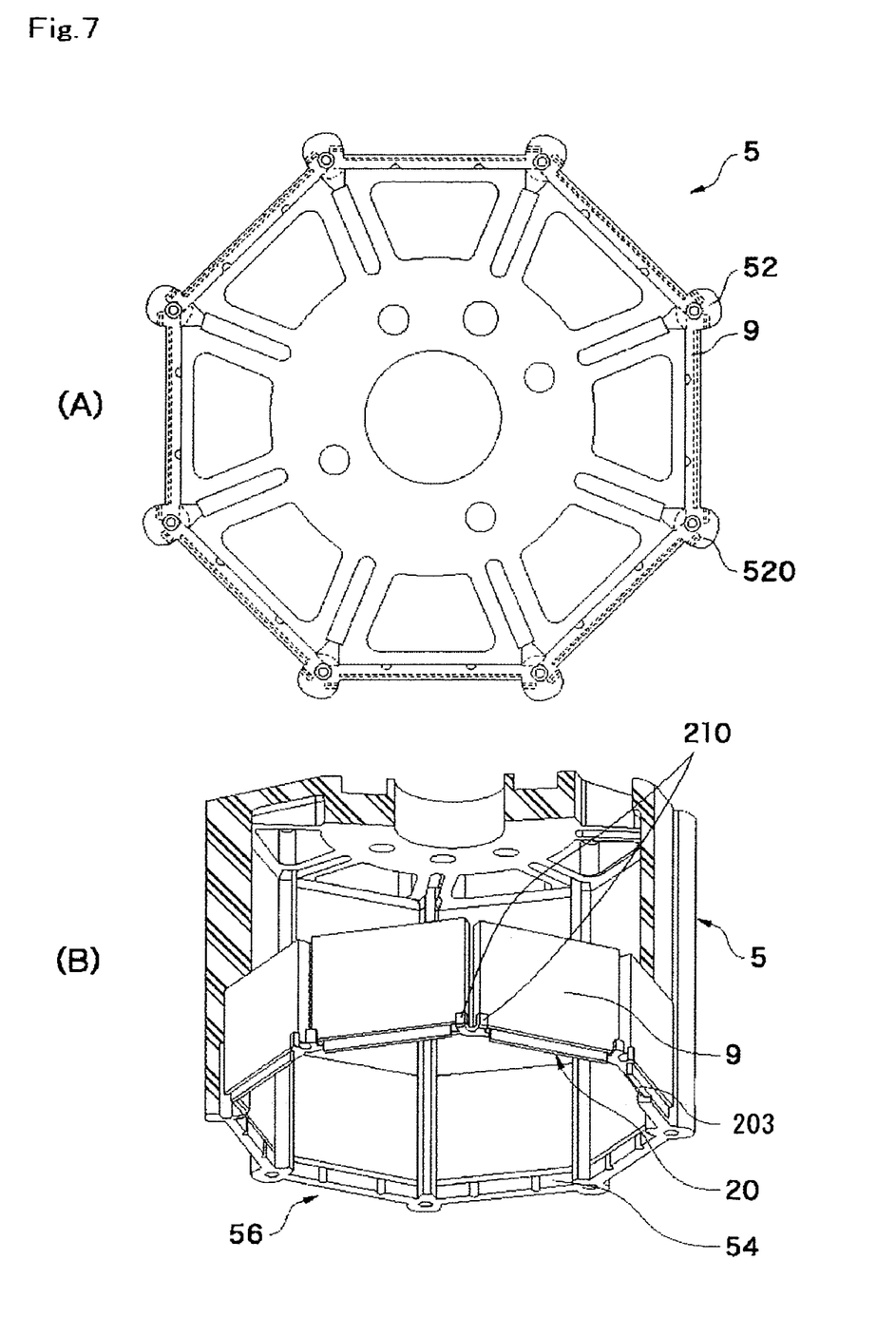
FIG. 7(A) is a plan view showing a movable body of the linear actuator in accordance with another embodiment of the present invention.
FIG. 7(B) is a perspective view showing the movable body which is partly cut and viewed obliquely from below.
Figure 8:
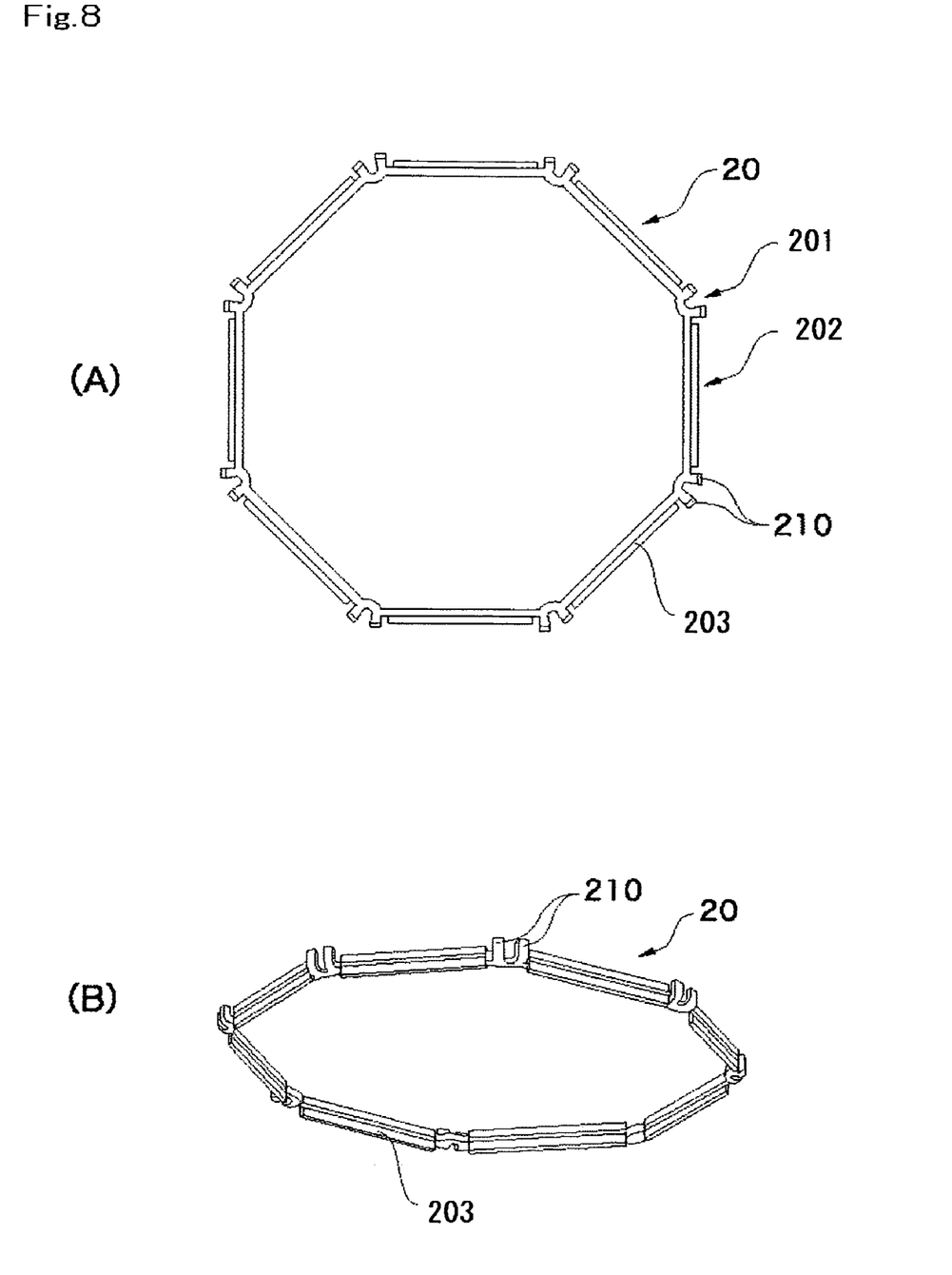
FIG. 8(A) is a plan view showing an expansion preventing member and FIG. 8(B) is a perspective view showing the expansion preventing member which is viewed obliquely from below.

FIG. 7(A) is a plan view showing a movable body of the linear actuator in accordance with another embodiment of the present invention, and FIG. 7(B) is a perspective view showing the movable body which is partly cut and viewed obliquely from below. FIG. 8(A) is a plan view showing an expansion preventing member and FIG. 8(B) is a perspective view showing the expansion preventing member which is viewed obliquely from below.

The expansion preventing member 20 is made of a non-magnetic material with a small coefficient of linear expansion and is formed in a ring planar shape of a regular octagon as shown in FIGS. 8(A) and 8(B). The expansion preventing member 20 is internally provided in the vicinity of the aperture edge part 56 of the movable body 5 as shown in FIG. 7(A) such that the corner parts 201 of the expansion preventing member 20 are positioned at the magnet holding parts 52 of the movable body 5. Therefore, the frame part 202 corresponding to each side of the regular octagonal shape of the expansion preventing member 20 coincides with the wall part 55 in the axial direction and a part of the frame part 202 is internally provided in the resin wall 54.

The corner part 201 is protruded outward in the radial direction so as to form in a "U"-shape and the tip ends of the corner part 201 are bent upward in the axial direction to be abutting parts 210 for abutting with the opposite faces of the magnet 9 to the outer yokes 4. Further, the frame part 202 is formed with a bent part 203. The bent part 203 is formed by using the outer side of the frame part 202 in the radial direction that is bent downward in the axial direction.

The expansion preventing member 20 is internally provided together with the magnet 9 by insert-molding when the movable body 5 is formed. In this case, the insert-molding is performed under the state that a positioning pin not shown engages with the inside of the "U"-shaped portion of the corner part 201. The lower end of the opposite face of the magnet 9 to the outer yoke 4 is positioned so as to abut with the abutting part 210 which is adjacent and located across the frame part 202. The face on the outer yoke 4 side of the bent part 203 is exposed from the resin wall 54 to be the opposite face to the outer yoke 4. The face on the opposite side of the bent part 203 is internally provided in the resin wall 54 to prevent the resin wall 54 from expanding. Further, the opposite face of the bent part 203 to the outer yoke 4 is formed to be the same plane with the opposite face of the magnet 9 to the outer yoke 4.

The movable body 5 in this embodiment of the present invention is formed in a tubular shape having the aperture edge part 56 which is opened at one end and the aperture edge part 56 is disposed between the inner yoke 3 and the outer yoke 4. In addition, the expansion preventing member 20 is disposed near the aperture edge part 56 of the movable body for preventing the expansion of the aperture edge part 56. Therefore, even when the ambient temperature rises at which the linear actuator 1 is operated, the expanding of the aperture edge part 56 can be restrained. Accordingly, even when the ambient temperature rises at the time of operation, malfunction can be prevented where the aperture edge part 56 of the movable body 5 disposed between the outer yoke 4 and the inner yokes 3 is brought into contact with the outer yoke 4.

In this embodiment of the present invention, for each of the outer yokes 4 and the inner yokes 3 are disposed eight pieces with planar opposite faces respectively at an equal angular interval in the circumferential direction and the movable body 5 includes eight magnets 9 which are respectively disposed between the inner yokes 3 and the outer yokes 4. Further, the magnet holding parts 52 are provided between adjacent magnets 9, which hold both sides of the magnet 9 in the state that at least a part of the magnet holding part 52 is positioned between adjacent inner yokes 3 and between adjacent outer yokes 4. In addition, the magnet holding part 52 is provided with the abutting part 210 of the expansion preventing member 20 which is formed in a ring shape. Therefore, the expanding of the aperture edge part 56 can be restrained by the abutting part 210 against the stress that causes the aperture edge part 56 to expand due to the attraction of the magnet 9 to the outer yoke 4. Moreover, since the abutting part 210 of the expansion preventing member 20 is internally provided in the magnet holding part 52, the abutting part 210 is not required to be disposed between the outer yoke 4 and the magnet 9 and thus the outer yoke 4 and the magnet 9 can be positioned in close proximity. Therefore, the improvement of the magnetic efficiency in the linear actuator 1 and the shortening in the radial direction can be attained.

The linear actuator 1 in accordance with the embodiments of the present invention may be applied to a pump device and a compressor device as described with reference to FIG. 9.

Figure 9:
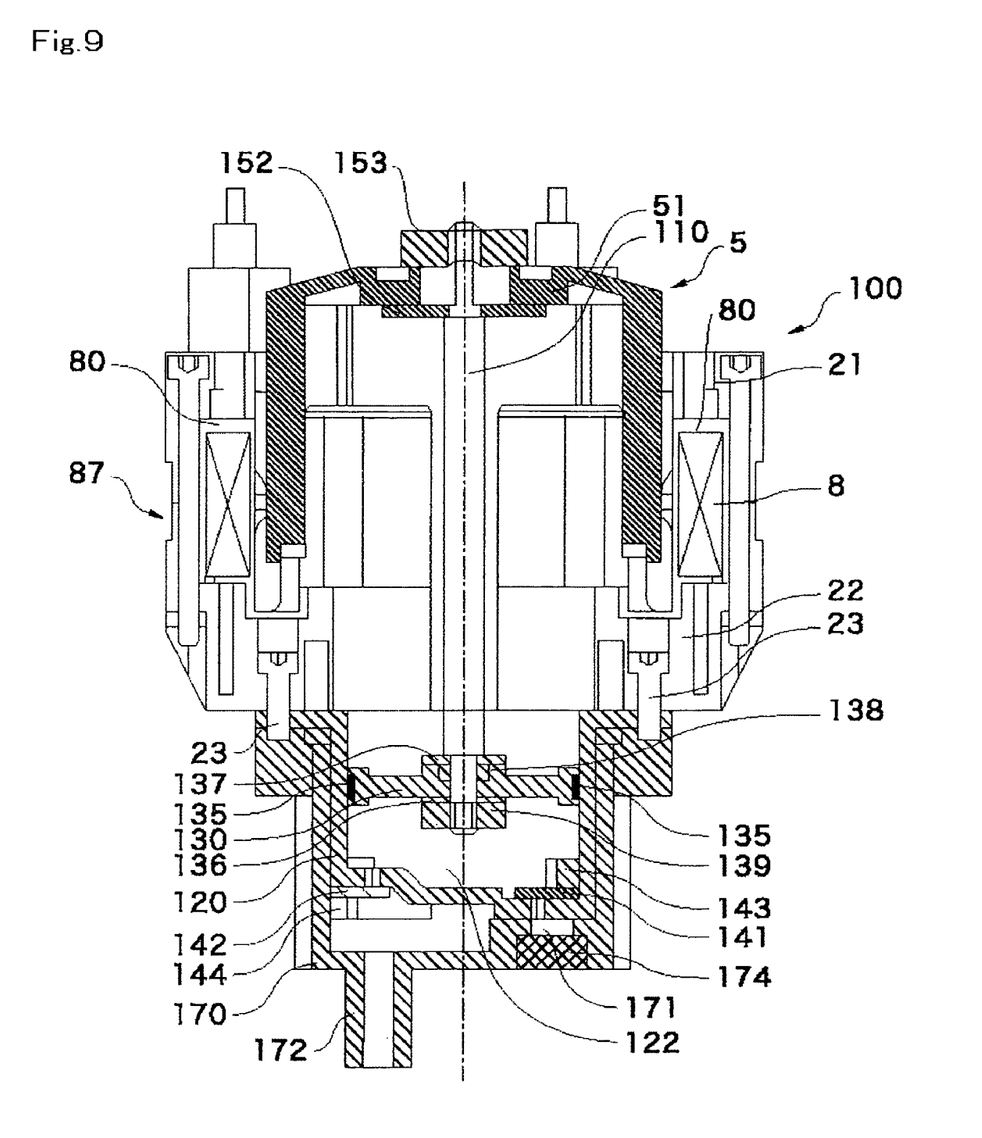
FIG. 9 is a cross-sectional view showing an air pump device in accordance with an embodiment of the present invention.

FIG. 9 is a cross-sectional view showing an air pump device in accordance with an embodiment of the present invention.

In FIG. 9, in the air pump device 100 in accordance with an embodiment of the present invention, the base end side of an actuating shaft 110 is connected to the movable body 5 of the linear actuator 1 with a washer 152 and a nut 153. The actuating shaft 110 is disposed so as to be passed through the cylindrical part 16 of the frame 2 which holds the inner yoke 3 as shown in FIG. 9.

On the bottom part of the holder 22 in the driving part 87 is fixed a main body side case 170 provided with an air inlet port 171 and an air outlet port 172 with male screws 23 and a filter 174 is mounted to the air inlet port 171. A cylinder case 120 is disposed in the inside of the case 170. A valve 141 is fixed with a valve presser 143 on a portion facing the air inlet port 171 in the bottom part of the cylinder case 120 and a valve 142 is fixed with a valve presser 144 on a portion facing the air outlet port 172.

A piston 130 is disposed in the inside of the cylinder case 120 to construct the cylinder chamber 122 between the bottom part of the cylinder case 120 and the piston 130. A pressure ring 135 is mounted to the side face of the piston 130 for ensuring the air-tightness with the inner peripheral side face of the cylinder case 120.

The piston 130 is fixed to the tip end portion of the actuating shaft 110 with a nut 139 through washers 136, 137 and an O-ring 138. The piston 130 is driven in the axial direction by the oscillation of the actuating shaft 110. Therefore, when the actuating shaft 110 is moved on the base end side in the axial direction (upward in the drawing) by the linear actuator 1, air is sucked into the cylinder chamber 122 from the air inlet port 171. When the actuating shaft 110 is moved on the tip end side in the axial direction (downward in the drawing) by the linear actuator 1, the air in the cylinder chamber 122 is discharged from the air outlet port 172. Further, in this embodiment of the present invention, the resonance by a spring or an externally equipped leaf spring that are not shown is utilized to the oscillation of the actuating shaft 110, and thus excellent pump characteristics can be obtained even though the air pump device 100 uses a small-sized linear actuator 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A linear actuator comprising:
   a driving part comprising:
      an inner yoke;
      an outer yoke which is disposed around the inner yoke such that a first gap space and a second gap space separated in an axial direction are formed between an outer peripheral face of the inner yoke and the outer yoke; and
      a coil for generating an alternating magnetic field in the first gap space and the second gap space with the outer yoke, the first gap space, the inner yoke, the second gap space and the outer yoke as a magnetic path; and
   a movable body provided with a magnet which is disposed between the inner yoke and the outer yoke, the movable body being reciprocated in the axial direction in cooperation with the alternating magnetic field;
   wherein the movable body is formed in a tubular shape having an aperture edge part with at least one end opened, and the aperture edge part or a portion near the aperture edge part is disposed between the inner yoke and the outer yoke and is positioned closer to the inner yoke side than to the outer yoke side.

2. The linear actuator according to claim 1, wherein the magnet disposed between the inner yoke and the outer yoke is disposed at the aperture edge part or the portion near the aperture edge part and is positioned closer to the inner yoke side than to the outer yoke side.

3. The linear actuator according to claim 2, wherein
   the inner yoke comprises a plurality of inner yokes disposed at an equal angular interval in a circumferential direction, each of the plurality of inner yokes has a planar opposite face to the outer yoke,
   the outer yoke comprises a plurality of outer yokes disposed at an equal angular interval in a circumferential direction, each of the plurality of outer yokes has a planar opposite face to the inner yoke,
   the magnet comprises a plurality of magnets which are respectively disposed between the inner yoke and the outer yoke, and all the plurality of magnets are positioned closer to the inner yoke side than to the outer yoke side.

4. A linear actuator comprising:
   a driving part comprising:
      an inner yoke;
      an outer yoke which is disposed around the inner yoke such that a first gap space and a second gap space separated in an axial direction are formed between an outer peripheral face of the inner yoke and the outer yoke; and
      a coil for generating an alternating magnetic field in the first gap space and the second gap space with the outer yoke, the first gap space, the inner yoke, the second gap space and the outer yoke as a magnetic path;
   a movable body provided with a magnet which is disposed between the inner yoke and the outer yoke, the movable body being reciprocated in the axial direction in cooperation with the alternating magnetic field, the movable body being formed in a tubular shape having an aperture edge part with at least one end opened, the aperture edge part being disposed between the inner yoke and the outer yoke; and
   an expansion preventing member which is disposed at the aperture edge part or the portion near the aperture edge part for preventing the aperture edge part from expanding.

5. The linear actuator according to claim 4, wherein
   the inner yoke comprises a plurality of inner yokes disposed at an equal angular interval in a circumferential direction, each of the plurality of inner yokes has a planar opposite face to the outer yoke,
   the outer yoke comprises a plurality of outer yokes disposed at an equal angular interval in a circumferential direction, each of the plurality of outer yokes has a planar opposite face to the inner yoke, and
   the magnet comprises a plurality of magnets which are respectively disposed between the inner yoke and the outer yoke,
   further comprising magnet holding parts for holding both sides of the magnet each of which is disposed between adjacent magnets such that at least a part of the magnet holding part is positioned between adjacent inner yokes and between adjacent outer yokes, the magnet holding part being provided with an abutting part of the expansion preventing member formed in a ring shape which abuts with an opposite face of the magnet to the outer yoke.

6. The linear actuator according to claim 4, wherein the expansion preventing member is formed of non-magnetic material.

7. A pump device comprising a linear actuator recited in claim 1.

8. A pump device comprising a linear actuator recited in claim 4.

9. A compressor device comprising a linear actuator recited in claim 1.

10. A compressor device comprising a linear actuator recited in claim 4.

11. A linear actuator comprising:
    a driving part comprising:
       an inner yoke;
       an outer yoke which is disposed around the inner yoke such that a first gap space and a second gap space separated in an axial direction are formed between an outer peripheral face of the inner yoke and the outer yoke; and
       a coil for generating an alternating magnetic field in the first gap space and the second gap space with the outer yoke, the first gap space, the inner yoke, the second gap space and the outer yoke as a magnetic path;

a movable body provided with a magnet which is disposed between the inner yoke and the outer yoke, the movable body being reciprocated in the axial direction in cooperation with the alternating magnetic field, the movable body being formed in a tubular shape having an aperture edge part with at least one end opened, the aperture edge part being disposed between the inner yoke and the outer yoke; and an expansion preventing member which is disposed at the aperture edge part or the portion near the aperture edge part for preventing the aperture edge part from expanding and contacting the outer yoke.

12. The linear actuator according to claim 11, wherein the inner yoke comprises a plurality of inner yokes disposed at an equal angular interval in a circumferential direction, each of the plurality of inner yokes has a planar opposite face to the outer yoke, the outer yoke comprises a plurality of outer yokes disposed at an equal angular interval in a circumferential direction, each of the plurality of outer yokes has a planar opposite face to the inner yoke, and the magnet comprises a plurality of magnets which are respectively disposed between the inner yoke and the outer yoke, further comprising magnet holding parts for holding both sides of the magnet each of which is disposed between adjacent magnets such that at least a part of the magnet holding part is positioned between adjacent inner yokes and between adjacent outer yokes, the magnet holding part being provided with an abutting part of the expansion preventing member formed in a ring shape which abuts with an opposite face of the magnet to the outer yoke.

13. The linear actuator according to claim 11, wherein the expansion preventing member is formed of non-magnetic material.

14. A pump device comprising a linear actuator recited in claim 11.

15. A compressor device comprising a linear actuator recited in claim 11.

* * * * *